United States Patent [19]

Eloranta et al.

[11] 4,360,260
[45] Nov. 23, 1982

[54] SPREADER ROLLER SYSTEM HAVING ADJUSTABLE ROLLER GAP

[75] Inventors: Vaito K. Eloranta, Needham; John W. Ford, Jr., Framingham, both of Mass.

[73] Assignee: Polaroid Corporation, Cambridge, Mass.

[21] Appl. No.: 308,423

[22] Filed: Oct. 5, 1981

[51] Int. Cl.³ .............................................. G03D 9/02
[52] U.S. Cl. ...................................... 354/304; 354/86
[58] Field of Search .................. 354/86, 303, 304, 301

[56] References Cited

U.S. PATENT DOCUMENTS

| 2,674,532 | 4/1954 | Pierce. |
| 2,686,716 | 8/1954 | Land. |
| 2,719,472 | 10/1955 | Land. |
| 3,229,605 | 1/1966 | Eloranta. |
| 3,335,652 | 8/1967 | Erikson. |
| 3,421,423 | 1/1969 | Downey et al. |
| 3,625,129 | 12/1971 | Van Allen. |
| 3,647,441 | 3/1972 | Bachelder. |
| 3,846,808 | 11/1974 | Whall .................. 354/86 |
| 3,882,518 | 5/1975 | Douglas ............. 354/301 |
| 4,149,789 | 4/1979 | Bass .................... 354/86 |
| 4,162,834 | 7/1979 | MacLean ............ 354/86 |

*Primary Examiner*—L. T. Hix
*Assistant Examiner*—Alan Mathews
*Attorney, Agent, or Firm*—Leslie J. Payne

[57] ABSTRACT

There is disclosed an assembly usable in a photographic apparatus for adjustably presetting the gap spacing of a pair of juxtaposed rollers used for spreading film processing fluid between a pair of sheets traveling therebetween. The presetting assembly includes a movable gap setting member having a plurality of surface portions formed thereon, each of which facilitates formation of a different gap which, in turn, facilitates a different processing fluid layer thickness. The member is movable in a manner which allows different ones of the surface portions to operatively cooperate with the rollers so as to establish correspondingly different gap spacings.

7 Claims, 7 Drawing Figures

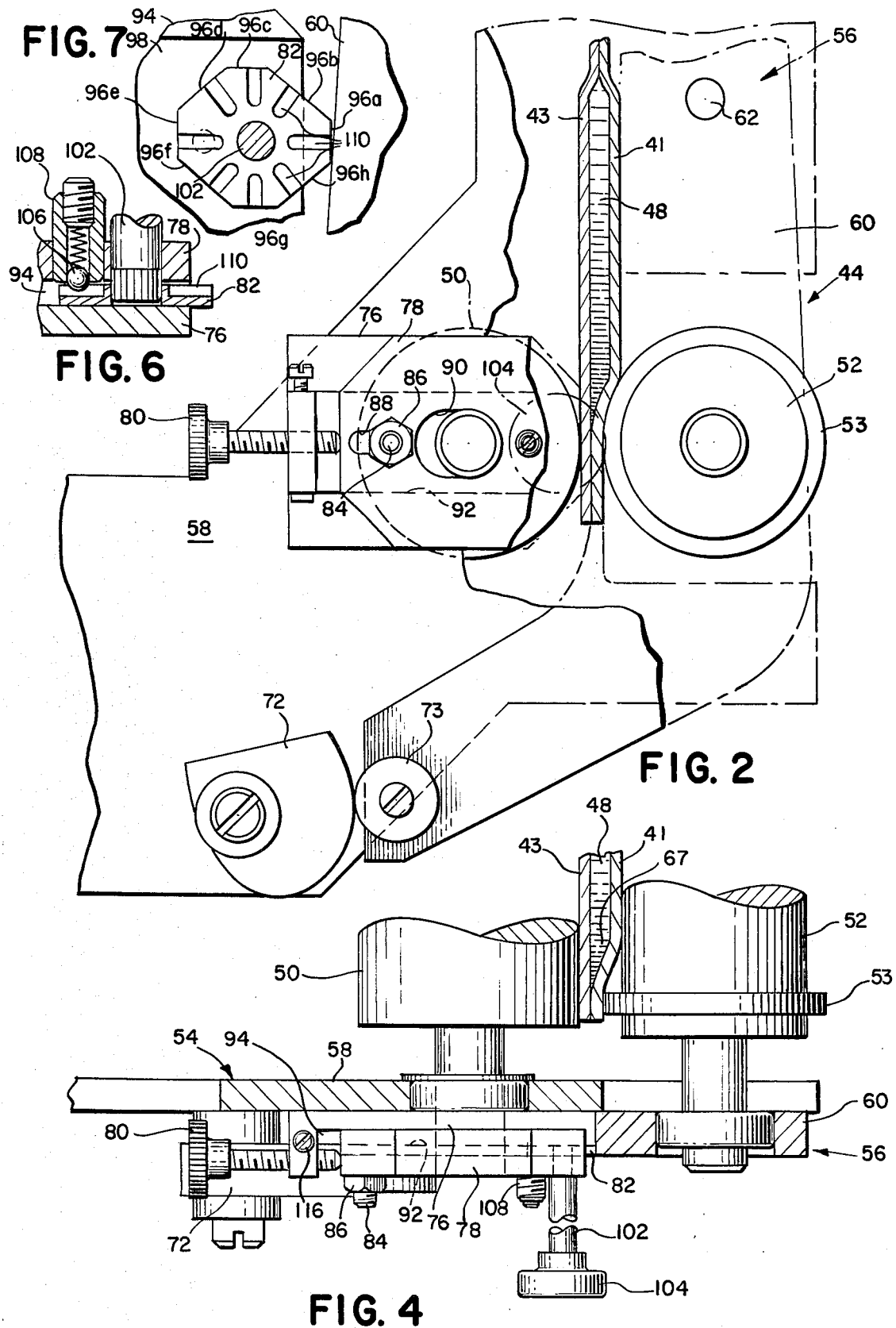

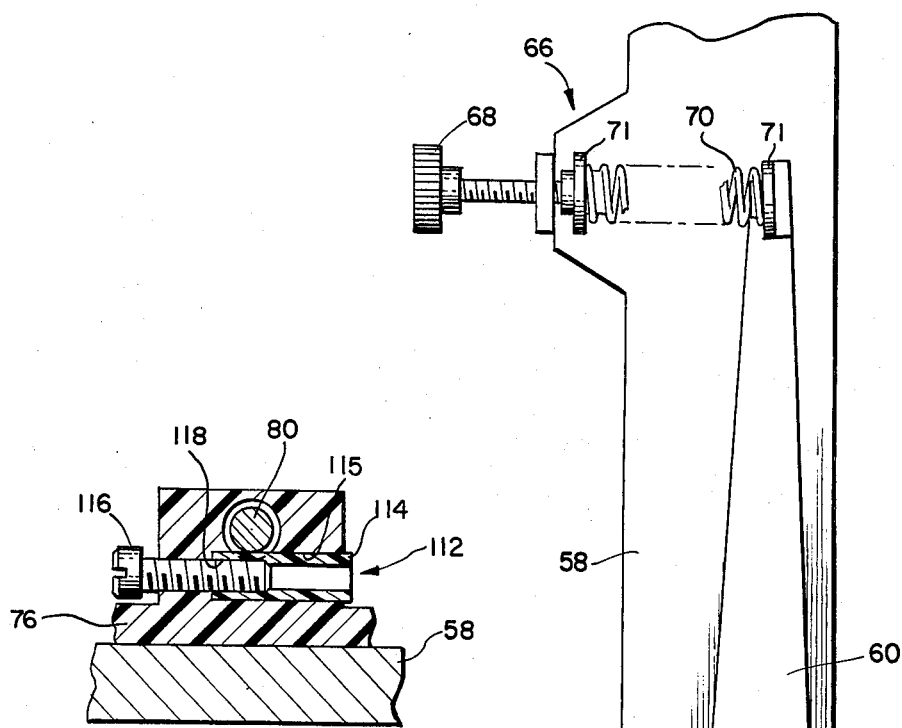
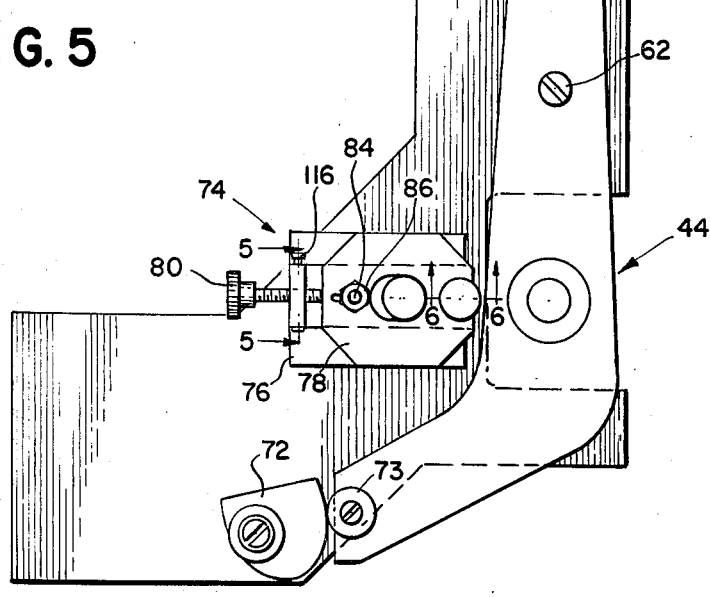
FIG. 5
FIG. 3

SPREADER ROLLER SYSTEM HAVING ADJUSTABLE ROLLER GAP

BACKGROUND OF THE INVENTION

This invention relates to spread roller systems usable in photographic products and, more particularly, to adjustable spread roller systems usable in a photographic apparatus of the instant type.

In photographic apparatus of the instant type, there is provided a spread roller system which typically includes a pair of rotatable pressure rollers. In operation, these rollers serve to release, advance and spread a liquid photographic reagant in a film unit as the latter passes therebetween. These rollers are biased towards each other and have a predetermined minimum gap therebetween. It is critical in such systems to have the minimum gap accurately set because the quality of the final image depends on the thickness of the processing fluid layer.

Commonly-assigned U.S. Pat. No. 2,686,716, issued to E. H. Land, describes two approaches for establishing the predetermined minimum gap. One approach establishes the gap through appropriately spaced apart openings formed in bearing plates rotatably supporting the rollers. The other more commonly used approach sets the gap by a pair of longitudinally spaced metallic collars on one roller which contact the periphery of the other roller. In this latter approach, each collar has a height on the order of the thickness desired for the layer of processing fluid to be spread. Such spread roller systems serve satisfactorily for the purposes intended.

However, it is desirable to switch between different kinds of film units. This is a practical difficulty insofar as the different types of film units, for example, black-and-white as opposed to color, require different processing fluid thicknesses. Obviously, such a requirement necessitates a change in the gap whenever it is desired to use a film unit requiring different thicknesses. For instance, to change from one film unit to another in a large format camera (e.g., 20"×24") requires replacement of the long roller carrying the gap spacing collars. Clearly, this causes a significant expenditure of time and is rather cumbersome. Obviously, it takes away from the photographer's time for photographic purposes. Consequently, different spread roller systems of the type having appropriately dimensioned collars would require replacement of the rollers for each change. Clearly, such kinds of changes prove burdensome and time-consuming.

Proposals have been put forth for adjusting the thicknesses of the processing fluid layer. One approach, disclosed in commonly-assigned U.S. Pat. No. 3,335,652, achieves different processing fluid thicknesses by adjusting the compressive forces of the spring system biasing the rollers together. Another approach for adjusting this gap is set forth in commonly-assigned U.S. Pat. No. 3,882,518. This latter patent discloses manually operated means for uniformly or differentially adjusting the spacing separating the cooperating spreading rollers and/or the magnitude of the biasing force applied by the rollers. With the foregoing proposed systems there are, however, no convenient, rapid and relatively reliable ways of accurately presetting the gap spacing.

SUMMARY OF THE INVENTION

In accordance with the present invention, there is provided an improved photographic apparatus having means for spreading processing fluid in a layer of predetermined thickness between a pair of superposed sheets as the sheets travel therethrough. Included in such spreading means is a pair of juxtaposed pressure members. Also included are means for yieldably biasing the members toward each other and means for spacing apart the members to define therebetween a gap to thereby establish the thickness of the spread layer of fluid.

In an illustrated embodiment, the spacing means includes a adjustable gap setting assembly having a plurality of preset positions, each of which defines different predetermined spacings between the pressure members, such that any one of the spacings may be selected in accordance with the selected position of the assembly to define selected thicknesses of the fluid layer and accommodate different predetermined film sheets.

In one embodiment, the gap setting assembly includes a cam member rotatable about a cam axis. The cam has a plurality of different surface portions spaced from the axis by different distances. These distances correspond to and facilitate establishment of the different gap spacings. Thus, by merely rotating the cam, a selected surface portion can be made to conveniently and easily cooperate with the spacing means to thereby preset the gap desired. This approach lessens the burden of accurately presetting the gap. Thus, photographers will not have to spend much time in making the necessary adjustments to the camera when using different types of film. Thus, a simple, convenient, rapid and relatively reliable arrangement is provided for adjusting the gap spacing.

Among the objects of the invention are, therefore, the provision of an improved photographic apparatus for spreading processing fluid in different thicknesses between a pair of superposed sheets; the provision of an improved apparatus for spreading processing fluid which includes means for conveniently adjusting the preset gap thickness between spreading rollers so as to facilitate formation of different spread fluid layer thicknesses; the provision of an improved apparatus of the above type wherein adjusting means is defined by a gap setting assembly that includes a cam member rotatable about a cam axis and having a plurality of cam faces spaced from the axis by different distances, wherein the different distances facilitate formation of different layer thickness; and the provision of an improved anti-backlash device.

Other objects and further scope of applicability of the present invention will become apparent from the detailed description to follow when taken in conjunction with the accompanying drawings in which like parts are designated by like reference numerals.

BRIEF DESCRIPTION OF THE DRAWINGS

FIG. 2 is an enlarged fragmentary view showing in greater detail the improved gap setting adjustment device of the present invention;

FIG. 3 is another fragmentary view similar to FIG. 2;

FIG. 4 is a fragmentary view showing another view of the improved gap setting adjustment device of the present invention;

FIG. 5 is a cross-sectional view taken along section line 5—5 appearing in FIG. 3;

FIG. 6 is a cross-sectional view taken along section line 6—6 appearing in FIG. 3; and FIG. 7 is a side elevational view of the camming member made in accordance with the present invention.

DETAILED DESCRIPTION

Figure 1:
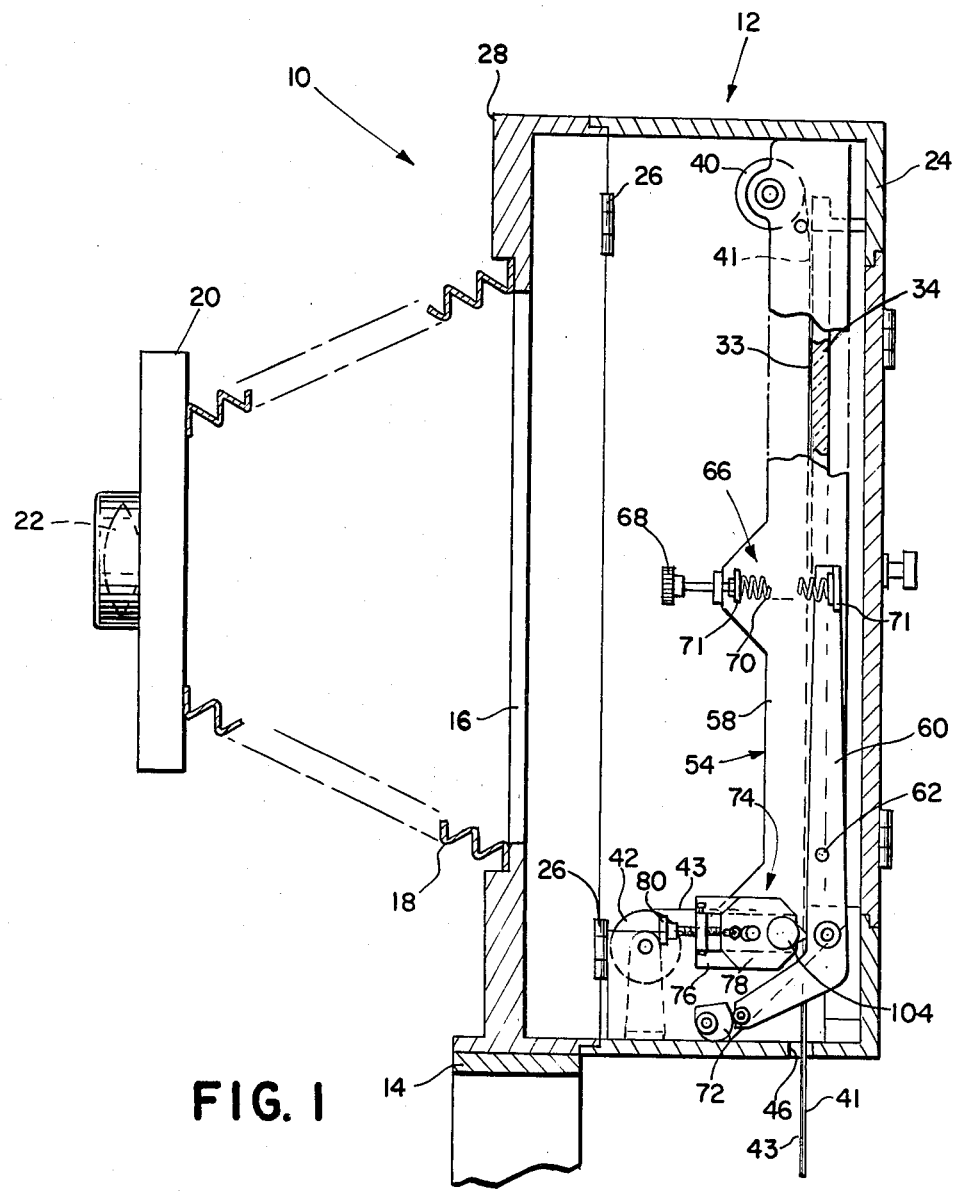
FIG. 1 is a cross-sectional, generally schematic, side view showing a large format photographic device of the instant type having an improved gap setting adjustment device of the present invention.

FIG. 1 is a view of a large format camera 10 of the instant kind, such as described in commonly-assigned U.S. Pat. No. 4,149,789, issued Apr. 17, 1979. Such large format cameras 10 are capable of producing directly a photographic image on the order of, for example, 20"×24" or larger. Since details of the camera 10 do not form an aspect of this invention, only those necessary for an understanding of the invention will be set forth. As illustrated, the camera 10 includes a body generally indicated at 12 supported by a carriage member, partly shown at 14. Formed in the forward portion of the body 12 is a rectangular opening 16 about which a bellows 18 is secured. The other end of the bellows 18 is connected to a lens board 20 for supporting an objective lens 22 as well as other conventional exposure components, such as a shutter and diaphragm (not shown). The bellows 18 is, of course, made to be extendable and collapsible.

The camera body 12 includes a box-like back compartment 24. Pivoted to one side of the back compartment 24, as by hinges 26, is a forward compartment 28 which defines the opening 16. An opening is provided in the rear wall of the back compartment 24, and is provided with an openable, hinged, light-tight door 32. In the opened condition, the door 32 defines an opening which permits viewing of the translucent viewing screen 34 by the operator. The front surface 33 of the viewing screen 34 defines the focal plane of the camera 10 along which the film passes over.

Across the upper portion of the back compartment 24 is mounted a roll 40 of photosensitive negative sheet material 41. At the bottom of the back compartment 24 is mounted a second roll 42 of positive sheet material 43. In the condition illustrated in FIGS. 1 and 2, the camera 10 is ready for exposure by drawing the negative sheet material 41 downwardly in front of the viewing screen 34 to and through the nip of the spread roller system 44 (FIG. 2) in a manner to be subsequently described. Likewise, the positive sheet 43 is drawn from the roll 42 so as to be in a generally coextensive and superposed relationship with the negative sheet 41. An exit slot 46 in the bottom of the camera compartment 24 allows exiting of the sheets 41, 43. Side guides (not shown) are provided along the marginal edges of the viewing screen 34 to insure retention of the negative sheet 41 against its front surface 33. Such an arrangement properly orientates the negative 41 on that film plane. The negative and positive sheet materials 41 and 43 are provided with an opaque backing. This prevents any unintentional exposure of either sheet 41, 43 to ambient light so long as they remain would on their respective rolls.

To supply the diffusion transferring film processing fluid 48 between the negative and the positive sheets 41, 43, respectively, there is provided a film processing fluid dispensing mechanism (not shown). Details of such a dispensing mechanism do not form part of the present invention; therefore, they have not been shown. However, any suitable type may be used. One such dispensing mechanism is described generally in commonly-assigned U.S. Pat. No. 4,162,834, issued July 31, 1979. Alternatively, there can be provided a pod dispensing magazine (not shown) which successively dispenses individual rupturable processing fluid pods between the negative and positive sheets prior to the sheets passing between spread roller system 44. For purposes of clarity in describing the present invention, such a fluid pod dispensing magazine has not been illustrated.

Reference is made to FIGS. 2-4 for showing greater detail of the improved spread rolling system 44. Essentially, the spread rolling system 44 includes a pair of pressure members or fluid spreading rollers 50 and 52. One spreading roller 50 is rotatably mounted in journal bearings on the fixed frame assembly 54, whereas the other spreading roller 52 is rotatably mounted in journal bearings on the movable frame assembly 56. It will be appreciated that a suitable motorized drive system (not shown) can be used to drive the rollers 50, 52 in unison and thereby the sheets 41, 43 traveling therebetween. Since such a motor mechanism does not form part of this invention, it has not been described. A pair of longitudinally spaced collars 53 are formed on the spread roller 52. Each of the collars 53 cooperates with the passing film sheets 41, 43 to define the longitudinal edge seals for the film format (FIG. 4). In this embodiment, the collars 53 are made of elastomeric material and are dimensioned so as to ensure proper edge sealing regardless of the gap spacing and different film format thickness. Also, the electromeric material overcomes imperfections in the sheet.

In regard to the fixed frame assembly 54, it includes a pair of generally parallel, spaced apart and upright side frames 58. Each of the side frames 58 is secured to and within the camera compartment 24. The movable frame assembly 56 includes a pair of pivotal lever arms 60, each of which is pivotally attached as at 62 to a corresponding one of the side frames 58 (FIGS. 2 and 4).

For yieldably biasing the spreading rollers 50 and 52 toward each other, there is provided a pair of spring mechanisms 66, only one of which is shown. Each spring mechanism 66 acts between a fixed frame 58 and a pivotal arm 60 (See FIGS. 1-3). As will be explained, the spreading rollers 50, 52 have a gap therebetween. This gap is, of course, used to regulate the desired thickness of a layer 67 (FIG. 4) of the processing fluid. The spring mechanism 66 yieldably urges the rollers 50, 52 together to define the gap which establishes the thickness of the spread layer 67 (FIG. 4). The rollers 50, 52 will, of couse, move apart when a pod (not shown) travels therebetween, but will be urged by the spring mechanism 66 back to their gap-defining positions. As shown in FIGS. 1 and 3, the spring mechanism 66 includes an adjusting screw 68 and a compression spring 70. The compression spring 70 is retained between a pair of plates 71. The spring 70 should provide a force greater than the hydraulic pressure of spreading the fluid. One of the plates 71 is connected to the upper end of the pivotal arm 60, while the other is secured to the leading end of the adjusting screw 68. By advancing or retracting the screw 68, the compression forces of the compression spring 70 are appropriately increased or decreased, respectively. The foregoing mechanism 60 provides means for yieldably biasing the spreading rollers 50 and 52 toward each other into an arrangement defining the preselected gap as well as for providing forces on the sheets 41, 43 and processing fluid to uniformly spread the processing fluid into a layer of desired thickness.

To facilitate drawing the negative and positive sheets 41, 43 between the rollers 50, 52, the latter are spread apart against the urging of the spring mechanisms 66. To achieve this, the lever arms 60 are pivoted counterclockwise, as viewed in FIG. 3. This is caused by the cam 72 contacting roller 73 and being rotated in the counterclockwise direction. The cam 72 is rotated on a shaft, manipulated from the outside of the camera 10, by an operator.

Reference is made to FIGS. 1-4 and 6, 7 for describing the adjustable gap setting assembly 74 of this invention. Basically, the gap setting assembly 74 includes a baseplate 76, a slidable block 78, a fine adjusting screw 80, and a camming member 82.

A threaded bolt 84 and nut 86 arrangement secure the baseplate 76 and block 78 to the fixed frame member 58. An elongated slot 88 in the block 78 permits longitudinal slidable movement of the block 78 with respect to the baseplate 76. A slot 90 in the sliding block 78 permits the latter to move relative to the stub shafts of the spread roller 50. The sliding block 78 has a channel 92 extending longitudinally therethrough which slidingly and guidingly cooperates with a rectangular guide block 94 formed on the baseplate 76.

In this invention, the camming member 82 can have a variety of shapes. In this embodiment, it has an octagonal shape (See FIG. 7). The periphery of the camming member 82 is provided with surface portions or camming surfaces 96a-h. Each camming face 96a-h is spaced from the rotational axis of the camming member 82 by a different distance. The camming member 82 is rotatable in a recess 98 formed in the guide block 94 (FIG. 7). Rotation of the camming member 82 is by an indexing mechanism 100. Indexing will allow different ones of the camming faces 96a-h to contact the pivotal arm 60. The different distances the faces 96a-h are spaced from the axis facilitate formation of different gap spacings which, in turn, define the different thicknesses of the fluid layers 67 and accommodate different predetermined film sheets. The indexing mechanism 100 includes a rotatable shaft 102 connected to the camming member 82. A knob 104 attached to the end of the shaft 102 allows an operator to rotate the camming member 82 to different positions, thereby allowing indexing of the camming faces 92a-h. A spring biased detent 106 is included in housing 108 attached to the sliding block 78. The detent 106 successively cooperates with successive ones of a plurality of radial grooves 110 formed on the inner face of the camming member as the latter is rotated. Each groove 110 is associated with one of the camming faces 96a-h so as to allow indexing of each camming face and maintaining each face at the desired position.

Because of the foregoing construction, the predetermined gap can be simply, rapidly, conveniently and reliably preset. The foregoing gap adjusting assembly 74, as noted, allows relatively accurate presetting of the gap. This is especially advantageous for someone, such as a photographer because it would free-up time that the photographer could use for photography instead of making tedious and time-consuming changes to set the proper gap whenever it is desired to change film formats (e.g., changing from color film to black-and-white film). With the present arrangement, an operator merely indexes the camming member 82 so that an appropriate one of the camming faces 96a-h engage the pivot arm 60. This is advantageous because it permits a user to quickly and reliably change the gap setting without resorting to the replacement of spreading rollers.

For purposes of finely adjusting the gap setting, the fine adjustment screw 80 is operated. As is seen, the adjustment screw 80 bears against and moves the sliding block 78 so as to even more accurately adjust the minimum gap. In this regard, to advance the block 78 and camming member 82 rightwardly as viewed in FIGS. 1-4, the screw 80 is advanced rightwardly. To advance the block 78 and camming member 82 leftwardly, the screw 80 is withdrawn leftwardly and the biased pivotal arm 60 will bear against the camming member 82 and the block 78 to force the latter into engagement with the end of the adjusting screw 80. Thus, the adjustment screw 80 provides means for positioning the slidable block 78 and the camming member 82.

It should be noted that the present invention also envisions that the camming member 82 could be placed on a pivotal arm 60 instead of frame 58. In such an arrangement, of course, the camming member 82 would be constructed and arranged to engage the frame 58.

Although the foregoing indexing mechanism 100 has been described, it is pointed out that any suitable indexing mechanism can be provided. For instance, the present invention contemplates that instead of a knob 104 being used to effect rotation of the shaft 102 the knob can be replaced by a ratchet wheel which is indexed by a spring biased plunger.

An anti-backlash assembly 112 is best shown in FIG. 5. Included in the anti-backlash mechanism 112 is a radially expandable and contractable nylon cylindrical plug 114. The plug 114 is secured within a bore 115 of the block 76 along an axis generally transverse to the longitudinal axis of the fine adjusting screw 80. A slotted end screw 116 is threadedly connected to the block 76 as well as an internally threaded bore 118 of the plug 114. Rotation of the slotted end screw 116, in one direction will draw the plug 114 inwardly and cause expansion thereof. This action applies forces against the threads of the adjustment screw 80 with sufficient magnitude to prevent any backlash movement of the screw 80 in both axial and radial directions. Rotation of the slotted end screw 116 in the opposite direction will enable relative contraction of the expandable plug 114. Therefore, there is a relative reduction in the amount of forces applied against the threaded periphery of the adjustment screw 80. By controlling the expansion and contraction of plug 114, the operator can adjust the forces applied to the screw 80. Nylon is chosen as the material of the plug 114 because it is able to be cut by the threads of the fine adjustment screw 80 as well as expand and contract as controlled by the screw 116. Other materials having similar properties can be used for these kinds of anti-backlash devices. Thus, the foregoing provides means for preventing backlash of a threaded member and for allowing relatively accurate adjustment of the forces applied by such means on such a threaded member.

Based on the foregoing description, it is believed that the structure and operation of the present invention is evident.

Since certain changes may be made in the above-described apparatus without departing from the scope of the invention herein involved, it is intended that all matter contained in the description or shown in the accompanying drawings shall be interpreted as illustrative and not in a limiting sense.

What is claimed is:

1. In a photographic apparatus having means for spreading processing fluid in a layer of predetermined thickness between a pair of superposed film sheets as the sheets travel therethrough, the spreading means including a pair of pressure members mounted in juxtaposed relationship with at least one of said members being movable with respect to the other, means for yieldably biasing said members toward each other, and means for spacing apart said members to define a gap therebetween and thereby establish the thickness of the spread layer of fluid, the improvement wherein said spacing means includes an adjustable gap setting assembly having a plurality of preset positions each of which define different predetermined spacings between said members such that any one of said spacings may be selected in accordance with the selected position of said assembly to define selected thicknesses of the fluid layer and accommodate different predetermined film sheets.

2. The apparatus of claim 1 wherein said gap setting assembly includes a cam having a given cam axis, said cam having a plurality of cam faces spaced at different distances from said cam axis, and means for mounting said cam for rotaion around said cam axis to said selected position in which each of said cam faces is brought into operative relation to said one pressure member.

3. The apparatus of claim 2 wherein said pressure members are mounted in a fixed and movable frame member, respectively, and said cam is mounted on said fixed frame member with its cam surface in engagement with said movable frame member whereby upon rotation of said cam each of its faces is successively brought into engagement with said movable frame member thereby defining different gaps.

4. The apparatus of claim 3 wherein said gap setting means includes a slidable member and guide means mounted on said fixed frame for guiding said slidable member, said cam member being mounted on said slidable member, and positioning means for incrementally advancing said slidable member in said guide means so as to provide a fine adjustment of the selected gap spacing set by the cam position.

5. The apparatus of claim 4 wherein said positioning means includes a first threaded member threaded through one end of and along the guide axis of said guide means, and backflash preventing means for preventing backlash of said first threaded member, said backlash preventing means including a threaded member which is threadedly connected to said guide means and is rotatable to advance said slidable member, said backlash preventing means including means for forcing said first threaded member in tight frictional engagement with said guiding means so as to take up any backlash between said first threaded member and said guiding means.

6. The apparatus of claim 5 wherein said backlash preventing means includes an expandable plug confined in the guiding assembly, said plug being made of a material that is able to be cut by the first threaded member during rotation; and a second threaded member threadedly connected to said plug so that upon rotation of said second threaded member said plug will expand and thereby increase the forces applied to said first threaded member so as to increase the frictional resistance of said first threaded member against said guiding assembly, whereby rotation of said second threaded member in an opposite direction allows contraction of said expandable plug so that frictional resistance of said first threaded member against said guiding assembly is lessened.

7. The apparatus of either claim 1, 2, 3, or 4 wherein one of said rotatable members includes a pair of longitudinally spaced apart resilient collars which cooperate with the sheets passing between said rotatable members to provide edge seals for the pair of sheets and processing fluid, said resilient collars being sized to accommodate for the selected different gaps.

* * * * *